May 6, 1952      A. S. PARKS      2,595,602
MEANS FOR SEPARATING GAS FROM LIQUIDS
Filed Feb. 3, 1950      3 Sheets-Sheet 1
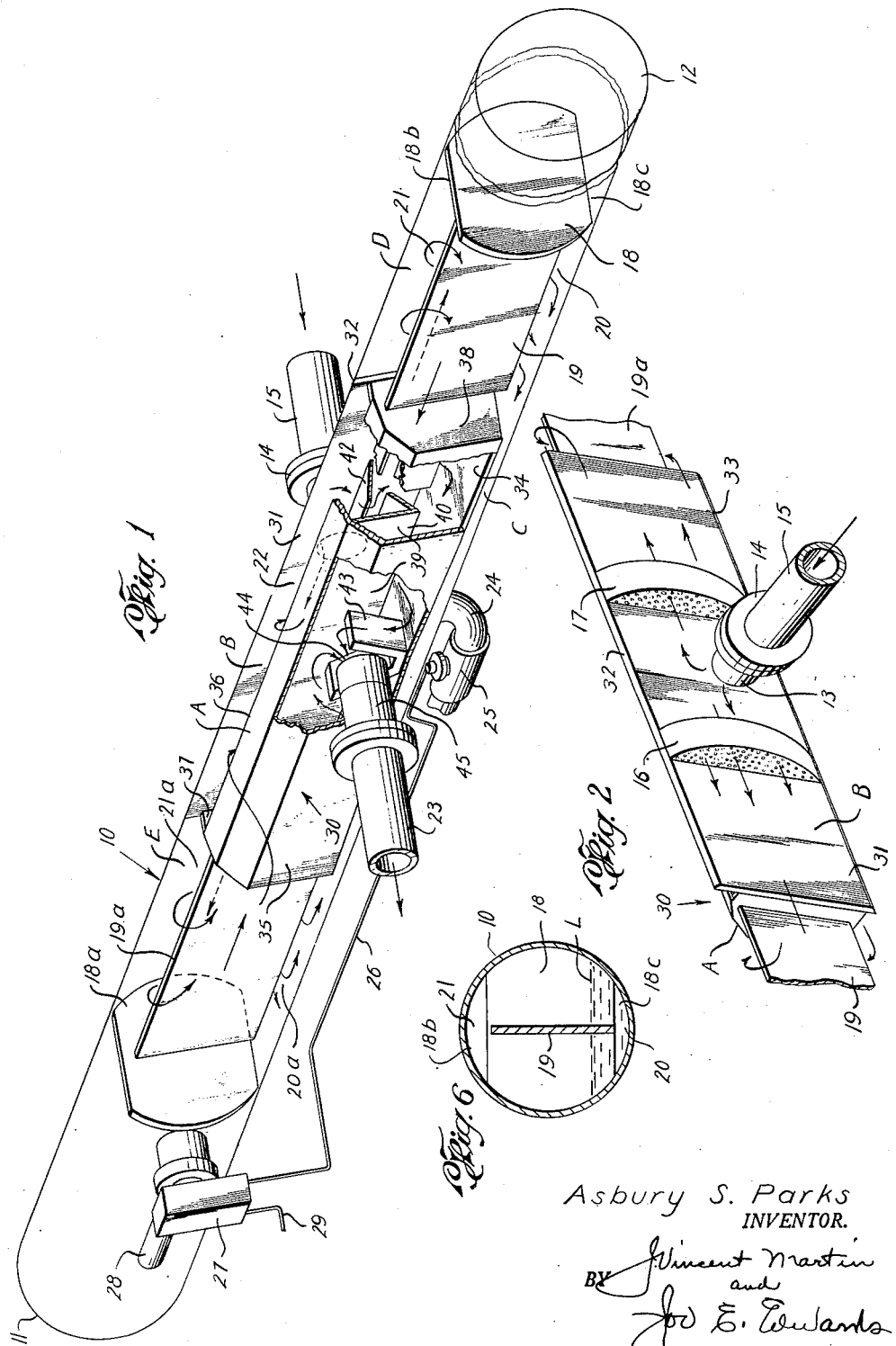
Asbury S. Parks
INVENTOR.
BY Vincent Martin
and
Joe E. Edwards
ATTORNEYS May 6, 1952 A. S. PARKS 2,595,602
MEANS FOR SEPARATING GAS FROM LIQUIDS
Filed Feb. 3, 1950 3 Sheets-Sheet 2
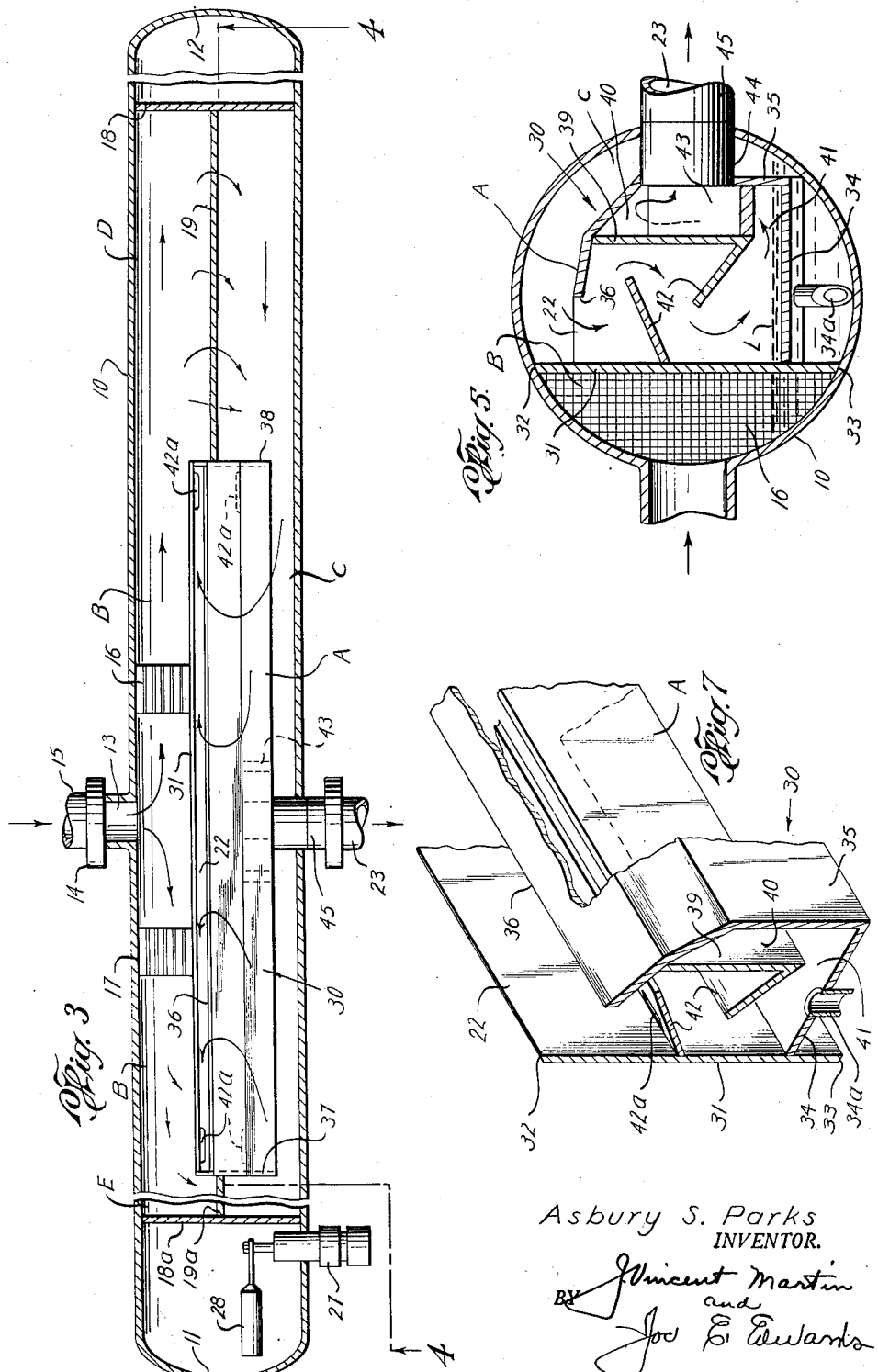
Asbury S. Parks
INVENTOR.
BY Vincent Martin
and
Joe E. Edwards
ATTORNEYS

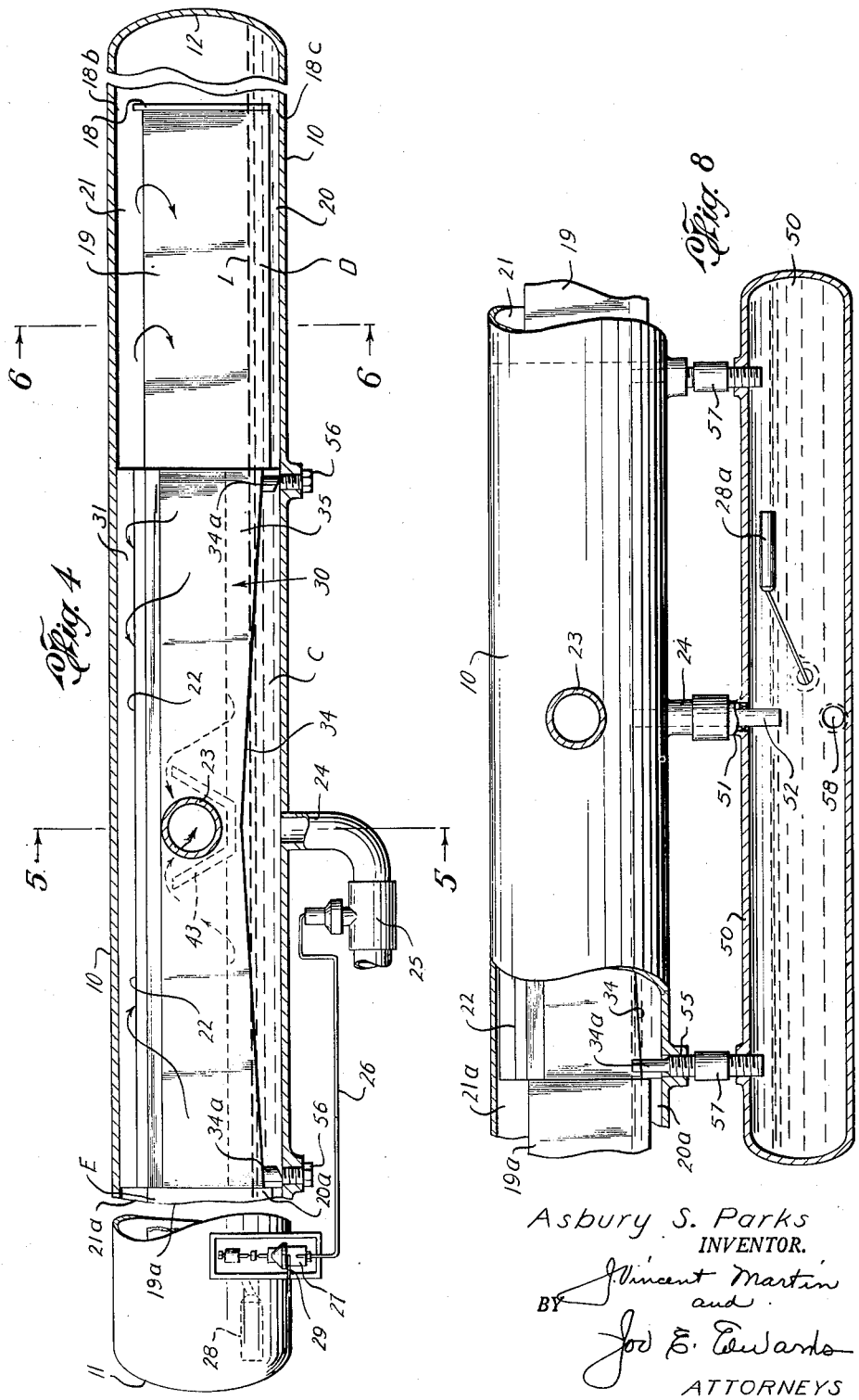

UNITED STATES PATENT OFFICE 2,595,602

MEANS FOR SEPARATING GAS FROM LIQUIDS

Asbury S. Parks, Houston, Tex.

Application February 3, 1950, Serial No. 142,200

15 Claims. (Cl. 183—2.5)

This invention relates to new and useful improvements in methods of and means for separating gas from liquids and relates particularly to improvements in horizontal separators.

As is well known, the horizontal type of gas and liquid separator has come into general use for accomplishing the separation of the gas from the liquids in well fluids as said fluids flow or are produced from a well. The usual horizontal separator comprises an elongate cylindrical vessel which is connected in the flow line and the well fluid stream is conducted through the vessel longitudinally or axially thereof. The vessel is of sufficient length to provide a natural separation zone wherein the major portion of the heavier liquids may precipitate or settle downwardly into a liquid accumulating area at the lower portion of the vessel while the gas stream having the lighter liquids entrained therein may continue in a longitudinal path and then through a scrubber element or baffle arrangement which is disposed beyond the so-called natural separation zone. The scrubber element or baffle arrangement presents numerous surfaces to the gas stream and the lighter entrained liquids within the stream upon contact with said surfaces coalesce and precipitate downwardly along the surfaces to the lower portion of the scrubber element from which point these liquids are conducted to the liquid accumulating area at the lower end of the vessel.

It is apparent that for economic reasons the diameter of the vessel is necessarily limited and with a longitudinal or axial flow through the vessel, as is the present practice, the size or area of the scrubber which is depended upon to remove the lighter entrained liquids is also limited. The scrubber can be no larger in diameter than the vessel and usually must be less than the inner cross-sectional area of the vessel because the lower portion of the vessel ordinarily functions as a liquid-accumulating area. This restriction as to the cross-sectional area of the scrubber exposed to fluid flow definitely limits the capacity of the separator since as the fluid stream flows through the scrubber a pressure drop is created across said scrubber; if this pressure drop exceeds a predetermined amount a "carry-over" of liquid from the liquid accumulating area of the vessel into the gas outlet line of the separator will occur. The volume of flow through the scrubber has a direct bearing on the pressure drop there across and thus the volume of fluid which may be conducted through the separator while still obtaining efficient separation, is restricted. An increase in the capacity of the separator is impossible so long as flow is longitudinally of the vessel without increasing the diameter of the vessel and this, as has been noted, is not practical since it increases the cost beyond economical limits.

It is, therefore, one object of this invention to provide an improved horizontal liquid and gas separator which is so constructed that the cross-sectional area of the scrubber element is not limited by the diameter of the vessel, whereby the capacity of the separator is substantially increased as compared to the usual horizontal separator of the same diameter.

An important object of the invention is to provide an improved horizontal liquid and gas separator, wherein the fluid flow is directed through the unit in such manner that the cross-sectional area of the flow space is amplified, whereby higher volumes of well fluids with less pressure drop across the scrubber element of the separator may be efficiently separated within the unit.

A particular object is to provide a horizontal separator which is so constructed that the cross-sectional area of the scrubber element may be increased to any desired point, whereby not only does the scrubber element have sufficient cross-sectional flow area to substantially eliminate or restrict a detrimental pressure drop thereacross but also said element presents amplified contact surfaces to the gaseous flow stream to increase coalescence and separation of the lighter entrained liquids from said gaseous stream.

Another object is to provide a horizontal separator, of the character described, having an initial natural separation zone, a quiescent settling zone and a final scrubber zone through which the well fluids are progressively directed, whereby substantially complete separation of the gas from the liquids is accomplished.

A still further object is to provide a horizontal separator wherein the well fluids enter the separator vessel in a plane transversely of said vessel and are then conducted through the vessel in a circuitous path which includes both longitudinal and transverse flow within the vessel, whereby maximum cross-sectional flow area, within a given diameter vessel, is provided.

A specific object is to provide a horizontal separator, of the character described, having an enlarged cross-flow or transverse zone intermediate the inlet and outlet, whereby a reduction in velocity of flow and amplified contact with the inner surface of the vessel by the flow stream is effected to increase the efficiency of separation of the liquids from the gas in said flow stream.

Another object of the invention is to provide an improved method of separating liquids from gas in a flowing well stream which includes, conducting the stream through a natural separation zone to permit the heavier liquids to precipitate and settle, changing the direction of flow of the stream to reduce the velocity and cause further settling of the liquids, then conducting the stream into contact with coalescing surfaces to separate entrained liquids from the gas, and finally recovering the gas and separated liquids separately from each other.

The construction designed to carry out the invention wil be hereinafter described together with other features thereof.

The invention will be more readily understood from a reading of the following specification and by reference to the accompanying drawings forming a part thereof, wherein an example of the invention is shown, and wherein:

Figure 1 is an isometric view of a horizontal separator constructed in accordance with the invention and with portions broken away to more clearly illustrate the apparatus, Figure 2 is a partial isometric view showing the fluid inlet to the separator, Figure 3 is a plan view with the walls of the vessel shown in section, Figure 4 is a longitudinal sectional view taken on the line 4—4 of Figure 3, Figure 5 is an enlarged transverse sectional view taken on the line 5—5 of Figure 4, Figure 6 is a transverse sectional view taken on the line 6—6 of Figure 4, Figure 7 is a partial isometric view of the scrubber element, and Figure 8 is a view partly in section and partly in elevation showing a slightly modified form of the invention.

In the drawings, the numeral 10 designates an elongate vessel or tank having its ends 11 and 12 closed. A well fluid inlet opening 13 is formed intermediate the ends of the vessel and said opening is surrounded by a flanged coupling nipple 14 whereby a well fluid inlet pipe 15 may be connected thereto. A scrubber assembly A which will be hereinafter described in detail is disposed within the central portion of the vessel and extends longitudinally thereof and the transverse width of the scrubber assembly is less than the diameter of the vessel whereby longitudinal flow areas or passages B and C are formed between the scrubber and the wall of the vessel. As is clearly shown in Figure 3, the flow area or passage B is adjacent the inlet side of the vessel while the flow area C or passage is on that side of the vessel which is diametrically opposed to or remote from the inlet 13.

The inlet 13 is illustrated as located substantially adjacent to the central portion of the scrubber assembly A and the well fluid stream entering said inlet strikes the wall of the scrubber A and is divided into two flow paths within the flow area B as indicated by the arrows in Figure 3. The divided flow stream flows longitudinally through the area B toward the ends of the scrubber assembly A. Within the flow area B and disposed on each side of the inlet 13 are a pair of defoaming elements 16 and 17 and the divided well stream is directed through these elements (Figure 2). Each of the elements 16 and 17 functions as a defoaming and coalescing pack and the well fluid streams flowing therethrough are thoroughly agitated and broken up as they pass therethrough.

That portion of the well stream which flows through the defoaming element 16 continues its movement longitudinally through the flow passage B toward one end of the scrubber assembly A and that part of the passage beyond the element 16 provides a natural separation zone wherein the heavier liquids in the stream may settle or precipitate downwardly while the gas rises toward the upper portion of the vessel. The fluid stream then enters a settling section or area D and contacts a transverse partition or plate 18 which is mounted within the vessel adjacent the closed end 12. The settling section D has a longitudinally disposed foam dam 19 therein which dam is formed by a flat plate member which extends longitudinally between the end of the scrubber assembly A and the partition 18. The height of the plate 19 is less than the internal diameter of the vessel 10 whereby a liquid passage 20 is provided beneath said plate while a gas passage 21 is formed above said plate.

It will be evident that as the well stream flows longitudinally through the natural separation zone of the flow area B the heavier liquids will settle or precipitate and the gas having lighter entrained liquid particles therein will be in contact with the inner surface of the vessel whereby some coalescing of the entrained liquid particles in the gas stream will occur. Upon being directed against the partition 18 a further coalescence of the entrained liquid particles will occur and also the direction of flow of the stream will be abruptly changed from a path longitudinally of the vessel to a path transversely thereof. Thus, the fluid stream is directed into contact with the surface of the plate or foam dam 19 whereby further coalescence is encouraged. The heavier liquids which were separated in the natural separation zone will, of course, drop to the bottom of the vessel and will accumulate therein. As will be explained, the level of the liquid which accumulates in the bottom of the vessel is controlled and this level is indicated at L in Figure 4. The partition 18 has its upper and lower ends terminating in spaced relation to the wall of the vessel to provide a flow space 18b and flow space 18c which establish communication between the chamber beyond the partition 18 and the section D.

As has been noted the flow of the well stream into the settling section D results in an abrupt change in the direction of flow. Also, since the cross-sectional area within the settling section is greater than the cross-section of the flow area or passage B between the scrubbing assembly and the vessel wall some reduction in velocity of flow will occur in the settling section D. The abrupt change in direction causes the stream to flow transversely of the foam dam or plate 19 and the gas rises and passes over the dam or plate through the passage 21 while the separated liquids flow through the passage 20 beneath the dam. The dam functions to skim any foam from the liquids flowing thereunder to retain the foam in the section D and thereby prevent said foam, which has gas bubbles therein from passing into the flow passage C with the liquids; the foam will, of course, ultimately disperse to separate the gas and liquids thereof. The gas stream flowing over the plate or dam 19 is moving transversely of the interior of the vessel and is thereby directed into contact with the opposite internal wall of the vessel. This further contact with the vessel wall of the transversely directed flow stream will further enhance or encourage coalescence whereby additional entrained liquid particles in the flow stream will be separated from said stream.

After moving through the settling section wherein the well fluids are in a more quiescent or less turbulent state than is the case within the area B, the flow stream having a major portion of the heavier liquid particles removed therefrom is again directed longitudinally of the vessel through the flow area C. From this area the stream which is primarily gaseous at this point but which still has some entrained liquid particles therein flows into the longitudinal inlet opening 22 of the scrubber assembly. As will be hereinafter explained, the gas stream passes through the scrubber assembly and escapes therefrom through an outlet pipe 23.

The foregoing description relates to a theoretical one-half of the fluid in-put and the other half of the flow stream which is that portion passing through the defoaming element 17 is directed in the same manner around the opposite end of the scrubber assembly A. This portion passes through a natural separation zone which is formed by the flow area B beyond the defoaming element 17 and then enters a settling section E wherein a foam dam 19a and end partition 18a are provided. The plate 19a is constructed in exactly the same manner as the plate 19 heretofore described and has a liquid passage 20a therebelow with a gas passage 21a thereabove. With this arrangement the incoming well fluids which are introduced through the inlet 13 are divided into two streams, one of which passes through the element 16, natural separation zone in the area B, settling section D, flow area C and through the scrubber assembly; the second stream flows around the opposite end of the scrubber assembly passing through the defoaming element 17, natural separation zone in the area B, settling section E, longitudinal flow area C and finally through the scrubber assembly A. It will thus be apparent that the flow of the incoming well fluids is first longitudinally of the vessel, then transversely and then again longitudinally thereof. The scrubber assembly A is an elongate structure having an inlet opening 22 which extends the entire length thereof so that there is substantially no restriction to flow entering the scrubber assembly. As will be hereinafter described the use of an elongate scrubbing assembly presents amplified contact surfaces to the gas stream flowing therethrough whereby substantially all of the lighter entrained liquid particles may be separated from the gas. The gas is withdrawn through the outlet 23 while the accumulated liquid in the lower end of the vessel is withdrawn through an outlet pipe 24 which extends downwardly from the central portion of the vessel.

It has been noted that the liquid level L of the accumulated liquid in the lower portion of the vessel is controlled and this is accomplished by connecting a dump or escape valve 25 in the liquid outlet line 24. This dump valve may be the usual type of pressure-actuated motor valve with the pilot pressure being conducted thereto by a pilot pressure line 26. A pilot pressure control valve 27 which is actuated by a float 28 mounted within one end of the vessel controls the application of pilot pressure from a supply line 29 to the motor valve 25. The particular details of the float 28 and the control valve 27 as well as the details of construction of the valve 25 are subject to variation and any well known type of liquid level control apparatus may be employed. As an example the liquid level control apparatus shown in my co-pending application, Serial No. 105,203, filed July 16, 1949, may be employed. It will be evident that the liquid level L will be automatically maintained in the lower portion of the vessel by means of the float 28 and its associated apparatus.

The scrubber assembly A is clearly shown in Figures 5 and 7 and said assembly includes a generally box-like casing 30 having one wall 31 extending longitudinally of the vessel with its upper longitudinal edge 32 and its lower longitudinal edge 33 (Figure 5) abutting and preferably secured to the inner wall of the vessel to form a longitudinal partition within the vessel. This wall 31 is adjacent to the inlet side of the vessel and coacts with a portion of the inner surface of the vessel to form the longitudinal flow area or passage B. The bottom 34 of the casing extends transversely across the lower portion of the vessel and is preferably made integral with the longitudinal wall 35 of the casing which is opposite to or remote from the wall 31. The upper end of the wall 35 is inclined, preferably at a double angle and has its edge 36 terminating in spaced relation to the wall 31 whereby the area between the edge 36 and said wall forms the longitudinal inlet opening 22 of the scrubber assembly. The ends of the casing 30 are closed by end plates 37 and 38 which are of the same contour as the cross-sectional shape of the box, with the upper end of each end plate terminating in the same plane as the upper edge 36 of the wall 35 of said casing.

A longitudinal partition 39 is mounted within the casing 30 in spaced relationship to the wall 35 whereby a longitudinal flow area 40 is provided between the partition and said wall 35. The ends of the partition are secured to the end plates 37 and 38 while the lower end of said partition terminates above the bottom 34 of the casing to provide a longitudinal flow space 41 below the partition, this space establishing communication between the interior of the casing and the flow area 40. Within the casing are a plurality of inclined longitudinally extending baffles or deflectors 42 which are arranged in staggered relation with respect to each other, that is, the uppermost baffle is secured to the inner surface of the wall 31 while the lowermost baffle is secured to the partition 39. The baffles have their ends fastened to the end plates 37 and 38 and adjacent each end each baffle is formed with a drain slot 42a (Figure 3) whereby liquid coalescing and draining down the inclined baffles may ultimately drain to the bottom of the casing 30.

The fluid stream after passing through the casing of the scrubber assembly is substantially free of liquid so that the flow through the longitudinal flow space 41 beneath the partition 39 of the scrubber assembly may be considered to be the gas separated from the original influent. This gas passes upwardly into the flow area 40 between the partition 39 and the wall 35 of the casing of the scrubber assembly and then flows over a generally V-shaped weir 43 (Figure 1) which is disposed adjacent the gas outlet opening 44 of the scrubber assembly. The opening 44 has a connecting nipple 45 extending therefrom and this nipple projects outwardly through the wall of the vessel and is connected to the gas outlet line 23. It will be evident that since the gas entering the flow area 40 from the lower end through the longitudinal flow space 41 must pass upwardly and over the upper end of the weir 43, the flow area 40 provides for additional natural separation whereby any liquids which might be carried over into this space may be settled out or precipitated. Therefore, the fluid passing outwardly through the opening 44 and then through the outlet line 23 is the gas which has been separated from the liquids of the influent. The bottom 34 of the scrubber assembly casing 30 is inclined in a longitudinal plane with the inclination extending from the central portion of the casing toward each end plate 37 and 38 (Figure 4) and drain tubes 34a are located adjacent each end plate. Thus, the liquid which is separated within the casing 30 may drain along the bottom thereof to the drain tubes and then into the lower portion of the vessel which, as has been noted, forms a liquid accumulating area wherein the liquid level L is controlled by the float 28.

In the operation of the separator, the well fluids influent is conducted to the vessel through the inlet line 15 whereby the flow stream is introduced into the vessel in a plane normal to the longitudinal axis or transversely of said vessel. The influent stream strikes the wall 31 of the scrubber assembly A and said stream is divided so that one-half of the stream passes through the defoaming element 16 with the remainder passing through the defoaming element 17. Each divided portion of the flow stream then flows longitudinally through the longitudinal flow passage or area B and a natural separation of the gas and liquids occurs since the heavier liquids precipitate or settle to the lower portion of the vessel. Because the flow passage or area B is somewhat restricted the stream will contact the surface of the wall 31 and also the inner surface of the vessel and this contact will encourage coalescence and precipitation of entrained liquids within the stream.

The divided streams, upon leaving the flow area or passage B, enter the settling sections D and E, respectively, and are directed into contact with the end partitions 18 and 18a whereby the course or path of each portion of the flow stream is abruptly changed. The cross-sectional area of each settling section is considerably larger than the restricted flow passage B so that as each portion of the stream enters its respective settling section, the velocity of flow is somewhat reduced which induces further settling or precipitation of the liquids from the stream. Also, the contact of the streams with the surfaces of the respective partitions 18 and 18a induce further coalescence and as the path of each stream is abruptly changed said stream is directed transversely of the vessel into direct contact with the respective foam dams or plates 19 and 19a. Each plate or foam dam functions to induce further coalescence of the entrained liquids which contact the same and also the dam serves to skim the foam off the liquids which are flowing beneath said dam. The gas stream which passes over each dam or plate 19 and 19a is, because of its transverse path, directed into contact with the inner surface of the vessel and this contact further encourages the coalescence and removal of liquids from the stream. It is noted that the reduction in the velocity of flow together with the longitudinal partition which extends across each settling section reduces the flow to a point whereby the fluids within the settling section are more or less in a quiescent state, whereby natural separation or settling of the heavier liquids is further enhanced.

Upon each portion of the flow stream completing its travel transversely of its respective settling section the path of flow is again abruptly changed to direct the flow stream into the longitudinal flow area C which is on that side of the scrubber assembly A opposite or remote from the influent inlet 15. Throughout this flow area further coalescence and settling of the liquids from the stream is accomplished and the gas rises to the upper portion of the vessel and passes into the scrubber assembly through the longitudinal inlet opening 22 in the upper portion thereof. Because the scrubber assembly A is disposed longitudinally of the vessel it is evident that it may be of any desired length so that the cross-section area of the inlet opening 22 of the scrubber assembly may be of any area capable of handling the desired capacity without causing an appreciable restriction at this opening. It is obvious that if the cross-sectional area of the scrubber assembly is relatively small a pressure drop across the scrubber assembly will occur and such pressure drop may result in carrying over liquids from the accumulating area in the lower portion of the vessel to the gas outlet line 23. By disposing the scrubber element longitudinally of the vessel the cross-sectional area of the scrubber element is relatively un-limited and thus the pressure drop across the scrubber element is substantially negligible.

As the flow stream, which at this point is primarily gas, passes into the scrubber element it is caused to flow around the inclined baffles 42 and in so doing contacts said baffles whereby coalescence of any entrained lighter liquid particles is accomplished. The stream then passes beneath the partition 39 (Figure 5) within the scrubber assembly and into the flow area 40 between the partition and the wall 35 of the scrubber assembly casing. From this point the gas must pass upwardly over the weir 43 and then escapes through the outlet 44 and gas outlet line 23. As has been noted the path which the gas must travel after entering the flow space 40 provides further time for settling of any liquids which might still remain in the gas after its passage through the casing 30 of the scrubber assembly.

The liquids which are separated during the flow of the fluids through the vessel are accumulated in the lower portion of the vessel as is clearly illustrated in Figure 4. The liquids which are separated within the scrubber assembly flow downwardly along the inclined baffles 42 and then through the escape slots 42a in the ends of these baffles to the lower portion of the casing 30 of the scrubber assembly. From this point these liquids escape from the scrubber assembly through the outlet tubes 34a and into the accumulating area in the lower portion of the vessel. The liquid level in the liquid accumulating area is controlled by means of the float 28 which operates the dump or escape valve 25.

From the foregoing it will be seen that an efficient separation of the liquids and gas in the influent stream is effected. The arrangement is such that the scrubber assembly presents an amplified cross-sectional area to the flow stream, which means that the pressure drop across the scrubber element may be maintained substantially negligible under extremely high volume of flow. Also, because the scrubber element may be of increased size due to its longitudinal disposition within the vessel the longitudinal baffles within said scrubber present amplified surfaces or areas which are contacted by the flow stream and these amplified contact surfaces increase the coalescence and recovery of liquids from the stream. It is apparent that the cross-sectional area of the scrubber element is not limited by the diameter of the vessel and thus may be made of any desired length whereby a high volume of fluid may be directed through the separator and efficient separation of gas and liquid effected without any carry-over of liquids into the gas outlet line. It might be noted that if too great a pressure drop is permitted across the scrubber element a suction effect would be produced at the flow passage 41 within the scrubber assembly which would be sufficient to siphon the liquid through the drain tubes 34a from the liquid accumulating area in the lower portion of the tank; by disposing the scrubber assembly longitudinally within the vessel the inlet opening 22 as well as the communicating passage 41 may be made of sufficient cross-sectional area for a given volume of flow to prevent sufficient pressure drop across the scrubber assembly to cause a carry-over of the separated liquid into the gas outlet line. At the same time, since the over-all cross-sectional area of the scrubber may be increased an amplified contact surface area in the form of longitudinal baffles 42 may be presented to the flow stream which increases separator efficiency. These are important features of the present invention.

Although it is desirable it is not necessary that the liquid accumulating area be located in the lower portion of the vessel and in some instances it may be preferable to provide a separate liquid accumulating container or tank. In Figure 8 such modification is shown wherein a separate accumulating tank 50 is disposed below the vessel 10. In this form a central nipple 51 in the accumulating tank 50 has connection with the liquid outlet 24 of the vessel 10 and an inner pipe 52 extends axially through the nipple and outlet and has its upper end projecting to a desired level within the vessel 10 with its lower end disposed within the tank 50. Below each drain tube 34a the vessel 10 has an opening 55 which is normally closed by a plug 56 but when the tank 50 is to be employed the plugs are removed and connecting pipes 57 connect the tank with the opening 55. Each pipe 57 has its upper end reduced and extending into and through the drain tubes 34a and the upper end of these pipes are in the same horizontal plane as the upper end of the communicating pipe 54. It will be evident that the pipes 54 and 57 function to maintain a desired level within the vessel 10 and any increase in this level will cause flow of the liquid in the liquid accumulating tank 50. A float 28a similar to the float 28 may be employed within the tank 50 to control the level therein. The float will actuate a dump valve (not shown) which controls flow through a liquid outlet 58 from the tank.

The operation of the separator shown in Figure 8 is identical to the operation of the separator shown in Figures 1–7. The only difference in the two structures is that in Figure 8 a separate accumulating vessel or tank is provided for accumulating the liquid which is separated whereby a larger volume of separated liquid may be accumulated than would be the case where the lower portion of the vessel 10 functions as the liquid accumulating area.

Having described the invention, I claim:

1. A horizontal liquid and gas separator including, an elongate vessel having closed ends and having a well fluid inlet intermediate its ends for conducting a well fluid stream into the vessel transversely thereof, a gas outlet extending from the vessel at a point remote from the well fluid inlet, a scrubber assembly disposed longitudinally within the interior of the vessel between the inlet and the gas outlet, and means for conducting the well fluid stream transversely of the longitudinally disposed scrubber element whereby the incoming well fluid stream is directed through the scrubber assembly to remove entrained liquid particles from said stream.

2. A horizontal liquid and gas separator including, an elongate vessel having closed ends and having a well fluid inlet disposed in a plane normal to the axis of the vessel, a scrubber assembly extending longitudinally within the vessel and having a longitudinal inlet passage at its upper end and having a fluid outlet communicating with its lower end, whereby the flow path through the assembly is transversely thereof, a circuitous flow passage within the interior of the vessel and defined by the wall of the vessel and the wall of the scrubber which extends between the well fluid inlet and the longitudinal inlet passage of the scrubber element, whereby incoming well fluid stream entering the well fluid inlet traverses the circuitous path formed by the flow passage to permit settling and precipitation of the heavier liquids in the stream prior to entry into the scrubber assembly, flow of the stream through said scrubber assembly removing the lighter entrained liquid particles from the stream so that the fluid escaping through the fluid outlet of the scrubber assembly is substantially dry gas.

3. A horizontal separator as set forth in claim 2, together with liquid conducting means extending from the scrubber assembly for conducting separated liquids from the assembly to the lower portion of the vessel, and a liquid outlet in the vessel for withdrawing the liquids therefrom.

4. A horizontal separator as set forth in claim 2, together with liquid conducting means extending from the scrubber assembly for conducting separated liquids from the assembly to the lower portion of the vessel, a liquid outlet in the vessel for withdrawing the liquids therefrom, and float controlled valve means in the liquid outlet for maintaining a predetermined liquid level in the vessel.

5. A horizontal liquid and gas separator including, an elongate vessel having a well fluid inlet for conducting a well fluid stream into the vessel, said vessel having a longitudinal confined flow passage extending from the inlet whereby a natural separation zone is provided by the passage which allows the natural settling or precipitation of heavier liquids, said vessel having a settling section into which the flow stream is directed upon leaving the longitudinal confined flow passage, means within the settling section for abruptly changing the path of flow of the well stream from longitudinally of to transversely of the vessel whereby coalescence of a portion of the entrained liquids in the well stream is induced, said vessel having a second longitudinal confined flow passage extending from the settling section whereby the path of the fluid stream is again changed upon leaving the settling section, and a scrubber assembly disposed longitudinally within the vessel having an inlet extending longitudinally thereof and communicating with the second longitudinal flow passage whereby the lighter entrained liquid particles in the flow stream are removed therefrom by said scrubber assembly.

6. A horizontal liquid and gas separator including, an elongate vessel having a well fluid inlet intermediate its ends for conducting a well fluid stream into the vessel, said vessel having a longitudinal flow passage extending from the inlet whereby a natural separation zone is provided by the passage which allows the natural settling or precipitation of heavier liquids, said vessel having a settling section into which the flow stream is directed upon leaving the longitudinal flow passage, means within the settling section for abruptly changing the path of flow of the well stream from longitudinally of to transversely of the vessel whereby coalescence of a portion of the entrained liquids in the well stream is induced, said vessel having a second longitudinal flow passage extending from the settling section whereby the path of the fluid stream is again changed upon leaving the settling section, a scrubber assembly disposed longitudinally within the vessel having an inlet communicating with the second longitudinal flow passage whereby the lighter entrained liquid particles in the flow stream are directed transversely of the scrubber assembly are removed therefrom by said scrubber assembly, outlet means for conducting the separated gas from the scrubber assembly, means for directing the separated liquids from the scrubber assembly to the lower portion of the vessel, and a liquid outlet extending from the vessel for withdrawing liquids therefrom.

7. A horizontal liquid and gas separator as set forth in claim 6, together with a defoaming and coalescing pack element mounted in the first longitudinal passage adjacent the well fluid inlet.

8. A horizontal liquid and gas separator including an elongate vessel having a well fluid inlet for conducting a well fluid stream into one longitudinal side of the vessel, an elongate scrubber assembly extending longitudinally within the vessel and having a fluid inlet in one wall thereof, said scrubber assembly inlet being located in that wall of the assembly which is remote from the well fluid inlet of the vessel, and means for conducting the incoming well stream longitudinally and exteriorly of the scrubber assembly and then around the end of said scrubber to the opposite longitudinal exterior side thereof, whereby the stream travels a circuitous path before entering the scrubber assembly which permits natural separation and coalescence of the heavier liquid particles in the stream prior to the passage of the stream to the scrubber assembly, and means for directing the stream through the scrubber assembly transversely thereof.

9. A horizontal liquid and gas separator including, an elongate cylindrical vessel having a fluid inlet, a scrubber assembly mounted within the vessel and comprising an elongate casing extending longitudinally of the vessel, said casing having a transverse width which is less than the internal diameter of the vessel whereby longitudinal flow areas are formed on each side of said scrubber assembly, the longitudinal wall of said scrubber casing which is adjacent the fluid inlet of the vessel having its longitudinal edges sealed against the wall of the vessel so that the fluid stream entering through the inlet is directed longitudinally of the casing, and around the end thereof, the longitudinal wall of the casing which is remote from the fluid inlet of the vessel having an elongate longitudinally extending inlet passage in its upper portion, whereby the fluid stream after passing around the scrubber assembly flows through the casing transversely thereof, and an outlet extending from the casing for conducting gas which has been separated from the flow stream from the scrubber assembly.

10. A horizontal liquid and gas separator including, an elongate cylindrical vessel having a fluid inlet intermediate its ends, a scrubber assembly mounted within the vessel and comprising an elongate casing extending longitudinally of the vessel, said casing having a transverse width which is less than the internal diameter of the vessel whereby longitudinal flow areas are formed on each side of said scrubber assembly, the longitudinal wall of said scrubber casing which is adjacent the fluid inlet of the vessel having its longitudinal edges sealed against the wall of the vessel so that the fluid stream entering through the inlet is directed longitudinally of the casing, and around the end thereof, the longitudinal wall of the casing which is remote from the fluid inlet of the vessel having an elongate longitudinally extending inlet passage in its upper portion, whereby the fluid stream after passing around the scrubber assembly flows through the casing transversely thereof, an outlet extending from the casing for conducting gas which has been separated from the flow stream from the scrubber assembly, a settling chamber formed at the end of the scrubber assembly within the interior of the vessel and a foam dam extending longitudinally of the vessel across the settling chamber.

11. A liquid and gas separator as set forth in claim 9, together with inclined elongate baffles arranged in staggered relation within the scrubber assembly casing for separating liquid particles from the flow stream, and means for conducting the separated liquid to an accumulating area in the lower portion of the vessel.

12. A liquid and gas separator as set forth in claim 2, together with a liquid accumulating tank below the vessel and communicating therewith, whereby liquids separated from the fluid stream as it flows through the vessel and scrubber assembly is conducted to said accumulating tank.

13. A horizontal liquid and gas separator including, an elongate vessel having closed ends and having a well fluid inlet for conducting a well fluid stream into the vessel, a gas outlet extending from the vessel at a point remote from the inlet, a scrubber assembly disposed longitudinally within the vessel between the inlet and the gas outlet and having a longitudinal inlet opening nearer its upper portion, means for conducting the well fluid stream from the well fluid inlet in a longitudinal path exteriorly of the scrubber assembly and then to the inlet opening of said scrubber assembly to direct the well fluid stream transversely of said assembly, whereby the entrained liquid particles are removed from the well fluid stream in its passage through the scrubber assembly.

14. A horizontal separator as set forth in claim 13, wherein said vessel has a settling section through which the well fluid stream is conducted subsequent to its travel through the longitudinal path and prior to its passage through the scrubber assembly.

15. A horizontal liquid and gas separator including, an elongate vessel having a well fluid inlet for conducting a well fluid stream into the vessel, said vessel having a longitudinal confined flow passage extending from the inlet whereby a natural separation zone is provided by the passage which allows the natural settling or precipitation of heavier liquids, said vessel having a settling section into which the flow stream is directed upon leaving the longitudinal confined flow passage, means within the settling section for abruptly changing the path of flow of the well stream from longitudinally of to transversely of the vessel whereby coalescence of a portion of the entrained liquids in the well stream is induced, said vessel having a second longitudinal confined flow passage extending from the settling section whereby the path of the fluid stream is again changed upon leaving the settling section, a scrubber assembly disposed longitudinally within the vessel having an inlet extending longitudinally thereof and communicating with the second longitudinal flow passage whereby the lighter entrained liquid particles in the flow stream are removed therefrom by said scrubber assembly, and a longitudinally disposed dam member extending within the settling section, said member terminating short of the top and bottom walls of the vessel to provide flow passages therearound, while presenting an amplified contact surface to the well fluid stream which enhances coalescence and also reduces velocity of flow of the stream within said settling section.

ASBURY S. PARKS.

REFERENCES CITED

The following references are of record in the file of this patent:

UNITED STATES PATENTS

| Number | Name | Date |
|---|---|---|
| 1,080,511 | Gamble | Dec. 2, 1913 |
| 1,611,639 | Hennington et al. | Dec. 31, 1926 |
| 1,910,728 | Waters | May 23, 1933 |
| 1,926,262 | Campbell | Sept. 12, 1933 |
| 2,206,336 | Rowand et al. | July 2, 1940 |
| 2,232,265 | Place | Feb. 18, 1941 |
| 2,349,944 | Dixon | May 30, 1944 |